C. R. SYLVANDER.
FEED ROLL FOR SPINNING MACHINES.
APPLICATION FILED JAN. 13, 1917.
1,264,452. Patented Apr. 30, 1918.
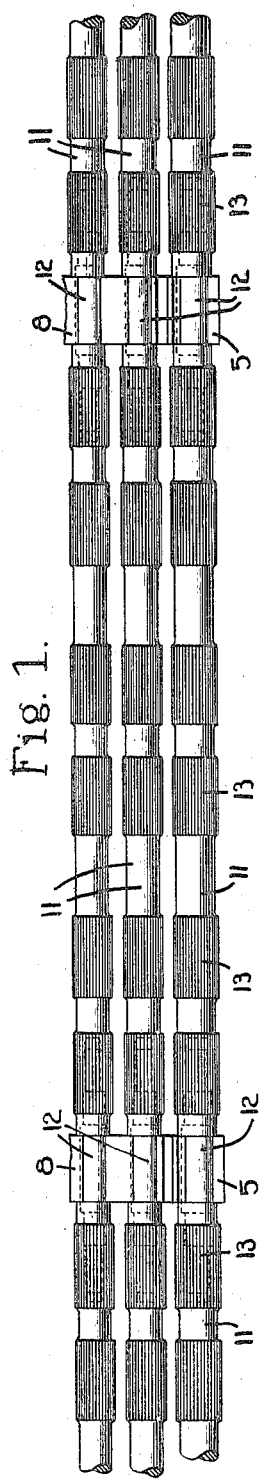
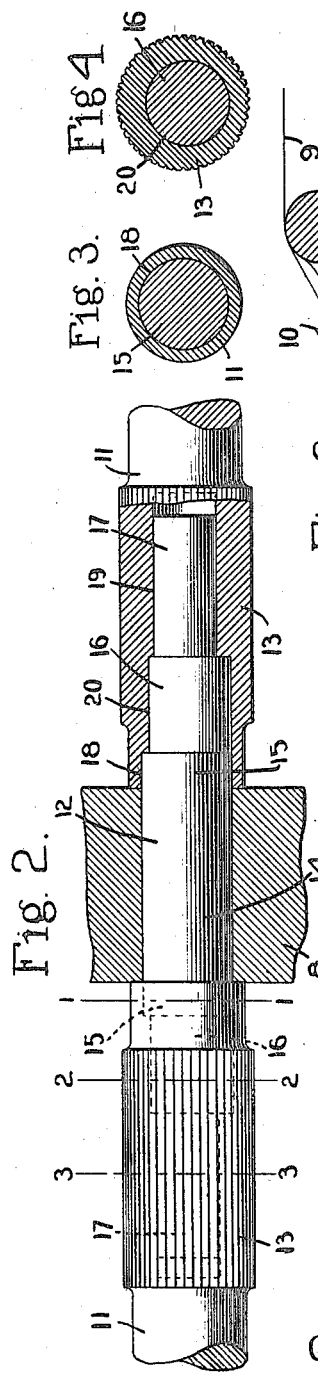
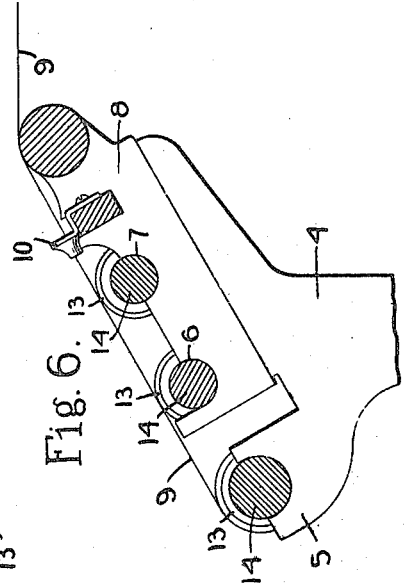
Inventor.
Charles R. Sylvander
by Heard Smith & Tennant.
Attys.

UNITED STATES PATENT OFFICE.

CHARLES R. SYLVANDER, OF TAUNTON, MASSACHUSETTS, ASSIGNOR TO MASON MACHINE WORKS, OF TAUNTON, MASSACHUSETTS, A CORPORATION OF MASSACHUSETTS.

FEED-ROLL FOR SPINNING-MACHINES.

1,264,452.  Specification of Letters Patent.  Patented Apr. 30, 1918.

Application filed January 13, 1917. Serial No. 142,207.

*To all whom it may concern:*

Be it known that I, CHARLES R. SYLVANDER, a citizen of the United States, residing at Taunton, county of Bristol, State of Massachusetts, have invented an Improvement in Feed-Rolls for Spinning-Machines, of which the following description, in connection with the accompanying drawing, is a specification, like characters on the drawing representing like parts.

This invention relates to a feed roll for spinning or similar machines and its object is to provide a roll made up of a plurality of alternating bearing and roll members, the bearing members coupling the roll members together in such a way that axial alinement of the successive members is secured throughout the length of the roll and the alined axes of the bearing members and roll members are caused to coincide with the axes of rotation of the bearing member.

The object of the invention is further to secure a construction which may be readily and cheaply manufactured while insuring accuracy and strength.

The object of the invention is further to provide a construction in which the bearing member shall be a separate member from the roll members and thus capable of being hardened or treated differently from the roll members as required by the conditions of use.

The object of the invention is further to provide a construction in which the bearing members may be finished by grinding to a true shape and fit after the hardening operation.

These and other objects of the invention will appear from the accompanying description and drawings and will be particularly pointed out in the claim.

The drawings show feed rolls embodying the preferred form of the invention in an ordinary type of spinning machine, only so much of the spinning machine as is necessary to disclosure of the invention being illustrated.

In the drawings—

Figure 1 is a top plan view of portions of three feed rolls and a pair of bearings in a spinning machine;

Fig. 2 is a view similar to Fig. 1 enlarged and partially in horizontal cross section showing the portion of a bearing of the spinning machine, a bearing member and the ends of two adjacent roll members;

Fig. 3 is a vertical cross section taken on the line 1—1 of Fig. 2;

Fig. 4 is a vertical cross section taken on the line 2—2 of Fig. 2;

Fig. 5 is a vertical cross section taken on the line 3—3 of Fig. 2;

Fig. 6 is a side elevation partially in vertical cross section of the bearing stand of the spinning machine and the feed rolls as shown in Fig. 1, but on a larger scale.

The ordinary spinning machine comprises a plurality of feed rolls, the lower usually of which are positively driven. These rolls extend throughout the length of the frame and are consequently of great length. They are made up of a plurality of members each having a plurality of roving or strand engaging zones and bearings are interposed at suitable points throughout the length of the rolls. The task of securing the roll members together into one continuous feed roll which should rotate without wabbling or irregularity of motion but on a single axis of rotation throughout has always been a difficult one and required much time and skill. Whenever a roll member was removed for repair or renewal and replaced the careful work to center and re-aline was again required. If as usual the bearing portion was formed as a part of a roll member it is difficult to give the proper hardening treatment to the bearing portion without distorting or injuring the remainder of the roll member. Usually the feed roll was brought into as close alinement as possible throughout by hammering by hand.

The present invention provides a feed roll which can be readily and easily manufactured by machinery obviating the necessity of slow and expensive hand work and securing perfect axial alinement throughout. The bearing members are made separate from the roll members thus enabling the roll members readily to be removed and replaced, and enabling the bearing members to be hardened and treated independently of the roll members.

In the construction illustrated the bearing stand 4 of the spinning frame is shown provided with three bearings one of which is in the portion 5 and the other two of which 6 and 7 are in the portion 8 adjustably mounted on the stand.

In Fig. 6 a strand 9 of roving is shown running through the usual trumpet 10 and over the feed rolls.

Three feed rolls are illustrated but as each is of the same construction but one need be described in detail.

The feed roll is made up of a plurality of roll members 11, one entire roll member and the adjacent ends of two others being shown in Fig. 1 in each case, and a plurality of bearing members 12 between and connecting each pair of adjacent roll members.

Each roll member is provided with a plurality of roving or strand engaging zones 13 which as shown are usually longitudinally corrugated or striated.

Each bearing member (see Fig. 2) comprises a central cylindrical bearing section 14 which fits and rotates in the bearing in the stand 4. The bearing section 14 is shown as extending at 15 beyond the bearing in the frame and these ends are preferably of the same diameter as the bearing section proper 14 but so long as they are concentric with the bearing portion proper 14 the diameter is not essential.

At each side of the bearing section are cylindrical sections 16 which are eccentric to the bearing section 14 and have their peripheries lying within the periphery of the bearing section.

The end sections 17 of the bearing member are formed concentric of the bearing section 14 and the periphery of each end section lies within the periphery of the adjacent eccentric section 16.

It will thus be seen that the bearing member as a whole is a separate member of the feed roll and may be readily hardened or treated as required by conditions. This bearing member may also readily be finished by turning or grinding before and after hardening and may be constructed with as great accuracy as required.

The roll members are formed at their ends to coöperate with and fit the ends of the bearing members. Hence each roll member at its end adjacent a bearing member presents a bore having an outer cylindrical section 18 fitting the end section 15 of the bearing member, an inner cylindrical concentric section 19 fitting the end section 17 of the bearing member, and an intermediate cylindrical eccentric section 20 fitting the corresponding intermediate eccentric section 16 of the bearing member.

These sections may obviously be readily formed by drilling or milling tools with as great accuracy as is desirable.

When the bearing members are fitted into the roll members the alined concentric cylindrical sections 15 and 17 of the bearing members coöperating with the similar alined concentric cylindrical bore sections of the roll member secured the absolute axial alinement of the bearing and roll members while the coöperating eccentric section 16 of the bearing members and eccentric section 20 of the bore of the roll member lock the two members together when rotation takes place and insure the members turning in unison. The fact that the eccentric portion is between two alined concentric cylindrical portions insures the axial alinement of the members even if there be any slight inaccuracy in construction. The arrangement of the concentric portions one adjacent to the bearing and the other at the end of the bearing member secures a concentric engagement of the parts on a theoretical line equal to the full length of the projecting portion of the bearing member. The roll members extend in one piece, that is, without joints, between the adjacent bearing members, so that the construction provides a continuous feed roll of single roll members extending between the several bearings and coupled to each other through the intermediate bearings by means of the bearing members which, as stated above, will usually be of different material from the roll members and hardened and ground so as to make the bearing of great accuracy and durability at the only points where there is any substantial wear in the length of the roll.

The assembling of the parts thus becomes perfectly simple. No hammering or driving to fit the parts together is required. The bearing member and the roll member are simply slid together and dropped into place. In the operation of the machine the entire length of feed roll runs with accuracy and there is no wabbling or unevenness in the rotation. If a bearing wears and requires rehardening, repair or renewal the bearing member is readily removed and replaced and the same way if a roll member becomes injured from any cause it is readily removed, repaired or renewed and replaced.

Having fully described my invention, what I claim as new and desire to secure by Letters Patent is:

The combination, in a spinning machine, of feed rolls and bearings therefor, each feed roll comprising a plurality of roll members 11 and bearing members 12, said roll members being identical with one another and each comprising a single integral member 11 located entirely between adjacent bearings, and said bearing members 12 being arranged one in each bearing and connecting together the roll members on opposite sides of said bearing, said bearing members being separate from the roll members so that they may be of different material and treatment therefrom, each of the intermediate bearing members comprising a central bearing portion and having on each side of such portion and projecting from each side of the bearing an identical roll-member-engaging portion comprising a pair of cylindrical portions concentric with the bearing, one adjacent to the bearing and the other at the end of the bearing member so as to secure a concentric engagement to the roll member on a line equal to the full length of the said roll-member-engaging portion, and a third portion intermediate between and eccentric to said pair, and the adjacent ends of the roll members having portions fitting over the entire projecting portions of the bearing members, whereby a continuous feed roll is secured made up of single roll members extending the entire distance between each pair of bearings and coupled to each other through the intermediate bearings by means of said bearing members.

In testimony whereof, I have signed my name to this specification.

CHARLES R. SYLVANDER.

Copies of this patent may be obtained for five cents each, by addressing the "Commissioner of Patents, Washington, D. C."